(12) United States Patent
Hisaoka (10) Patent No.: US 11,370,289 B2
(45) Date of Patent: Jun. 28, 2022

(54) WORK VEHICLE

(71) Applicant: ISEKI & Co., LTD., Ehime-ken (JP)

(72) Inventor: Yasuhiro Hisaoka, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 27 days.

(21) Appl. No.: 16/943,158

(22) Filed: Jul. 30, 2020

(65) Prior Publication Data

US 2021/0061082 A1 Mar. 4, 2021

(30) Foreign Application Priority Data

Aug. 30, 2019 (JP) .............................. JP2019-158427

(51) Int. Cl.
| | |
|---|---|
| *B60K 5/00* | (2006.01) |
| *B60Q 1/04* | (2006.01) |
| *B60Q 5/00* | (2006.01) |
| *B60R 13/08* | (2006.01) |
| *B62D 25/12* | (2006.01) |
| *F01N 1/02* | (2006.01) |
| *F01N 13/14* | (2010.01) |

(52) U.S. Cl.
CPC .............. *B60K 5/00* (2013.01); *B60Q 1/0483* (2013.01); *B60Q 5/00* (2013.01); *B60R 13/0869* (2013.01); *B62D 25/12* (2013.01); *F01N 1/02* (2013.01); *F01N 13/14* (2013.01)

(58) Field of Classification Search
CPC ........ B60K 5/00; B60K 13/04; B60K 5/1233; B60K 2005/003; B60Q 1/0483; B60Q 5/00; B60R 13/0869; B62D 25/12; B62D 25/10; B62D 25/082; B62D 25/085; F01N 1/02; F01N 13/14; B60Y 2200/221; B60Y 2200/2233; B60Y 2200/252; B60Y 2410/114

See application file for complete search history.

(56) References Cited

U.S. PATENT DOCUMENTS

| | | | | | |
|---|---|---|---|---|---|
| 5,873,224 | A | * | 2/1999 | Murakawa | ............. A01D 34/64 56/11.4 |
| 2004/0216934 | A1 | * | 11/2004 | Tomiyama | ............. B60K 11/04 180/68.1 |

(Continued)

FOREIGN PATENT DOCUMENTS

| | | | | | |
|---|---|---|---|---|---|
| EP | | 2610147 A2 | * | 7/2013 | ........... B62D 25/084 |
| JP | | 2001-303946 A | | 10/2001 | |

(Continued)

*Primary Examiner* — James A Shriver, II
*Assistant Examiner* — Ian Bryce Shelton
(74) *Attorney, Agent, or Firm* — Finnegan, Henderson, Farabow, Garrett & Dunner, LLP (57) ABSTRACT

Provided is a work vehicle in which components such as a headlamp are less likely to be affected by heat. The work vehicle includes a running vehicle body which includes running devices and to which a work machine can be replaceably connected; an engine mounted on the running vehicle body and serving as a drive source for the running devices and the work machine; a bonnet covering the engine; a headlamp attached to a front portion of the bonnet; a muffler arranged below the headlamp in an internal space of the bonnet; and a heat shield member arranged between the headlamp and the muffler.

7 Claims, 7 Drawing Sheets

(56) References Cited

U.S. PATENT DOCUMENTS

| | | | | |
|---|---|---|---|---|
| 2014/0020972 A1* | 1/2014 | Masumoto | .......... | F01N 13/1805 |
| | | | | 180/309 |
| 2014/0083791 A1* | 3/2014 | Togo | ........................ | F01N 3/08 |
| | | | | 180/309 |
| 2016/0031486 A1* | 2/2016 | Shoen | .................... | B60K 11/04 |
| | | | | 180/68.3 |
| 2017/0129544 A1* | 5/2017 | Komorida | .............. | B62D 25/10 |
| 2019/0276103 A1* | 9/2019 | Ono | ........................ | B62D 21/18 |

FOREIGN PATENT DOCUMENTS

| | | | | | |
|---|---|---|---|---|---|
| JP | 2016078824 A | * | 5/2016 | ............. | F02M 26/22 |
| KR | 20140135938 A | * | 11/2014 | ........... | B62D 25/082 |
| WO | WO-2014108788 A1 | * | 7/2014 | ............. | F01N 13/14 |

\* cited by examiner

"WORK VEHICLE

CROSS REFERENCE TO RELATED APPLICATIONS

This application claims priority to Japanese Patent Application No. 2019-158427, filed Aug. 30, 2019, the disclosure of which is incorporated herein by reference in its entirety.

BACKGROUND

The disclosure relates to a work vehicle.

Conventionally, as an example of a work vehicle, there is known a tractor in which a muffler is arranged at a lower front portion in a bonnet covering an engine, a pest control pump is arranged below the muffler, and a lower portion of the muffler is covered with a bottom cover (see JP-A-2001-303946).

With this configuration, the heat generated from the muffler is dissipated by a cooling air from a cooling fan of the engine, and the overheating of the bottom cover is suppressed.

Therefore, it is possible to prevent crops from being damaged due to heat even when crops come into contact with the bottom cover while work is being performed.

SUMMARY

In a conventional working vehicle such as a tractor in which the muffler is arranged inside the bonnet, a headlamp may also be arranged near the muffler. Therefore, a cover of the headlamp and a covering portion of a harness, which are made of resin or the like, are sometimes affected by the heat of the muffler.

The present disclosure has been made in view of the above situations, and an object thereof may be to provide a working vehicle in which components such as a headlamp are less likely to be affected by heat.

In order to solve the above problems and achieve the object, a work vehicle according to a first aspect may include a running vehicle body (1) which includes running devices (4, 5) and configured to be replaceably connected to a work machine (60); an engine (E) mounted on the running vehicle body (1) and serving as a drive source for the running devices (4, 5) and the work machine (60); a bonnet (B) covering the engine (E); a headlamp (6) attached to a front portion of the bonnet (B); a muffler (M) arranged below the headlamp (6) in an internal space of the bonnet (B); and a heat shield member (30) arranged between the headlamp (6) and the muffler (M).

According to the work vehicle of the first aspect, the heat shield member provided between the headlamp and the muffler as a heat source can prevent the headlamp from being adversely affected by heat.

In a work vehicle according to a second aspect, the heat shield member may have a first heat shield plate portion located below the headlamp, and a second heat shield plate portion that is bent from the rear end of the first heat shield plate portion so as to cover a rear portion of the headlamp. Therefore, in addition to the effects achievable in the first aspect, it is also possible to prevent heat from the engine as a heat source from being transmitted to the rear portion of the headlamp.

In a work vehicle according to a third aspect, the working vehicle includes a headlamp stay for connecting the headlamp to the bonnet, and a mounting plate for mounting the headlamp stay onto the bonnet. Therefore, in addition to the effects achievable in the first or second aspects, the headlamp can be simply and securely attached to the bonnet.

In a work vehicle according to a fourth aspect, a bonnet frame for supporting the bonnet has left and right extension located below the muffler and rotatably supported, and upward extensions extending upward from both ends of the left and right extension and connected to the bonnet via the mounting plate, and the bonnet frame is formed in a substantially U shape in a front view. Therefore, in addition to the effects achievable in the third aspect, the headlamp can be more securely fixed to an upper portion of an internal space of the openable bonnet.

In a work vehicle according to a fifth aspect, the heat shield member is attached to the headlamp stay, and the muffler is connected to the engine and is not connected to the bonnet frame and the heat shield member. In this manner, the muffler is supported by a system different from the headlamp. Therefore, in addition to the effects achievable in the fourth aspect, it is also possible to make it more difficult for heat and vibration to be transmitted to the headlamp.

In a work vehicle according to a sixth aspect, a horn is connected to the heat shield member. Therefore, in addition to the effects achievable in any one of the first to fifth aspects, it is also possible to suppress the adverse effects of heat from the muffler on the horn while improving the acoustic effect of the horn.

Objects and advantages of the disclosed embodiments may be realized and attained by the elements and combinations that may be set forth in the claims. However, embodiments of the present disclosure are not necessarily required to achieve such exemplary objects and advantages, and some embodiments may not achieve any of the objects and advantages discussed above.

DESCRIPTION OF EMBODIMENTS

Hereinafter, an embodiment of a work vehicle disclosed in the present application will be described in detail with reference to the accompanying drawings. The disclosure is not limited to the embodiment described below.

Figure 1:
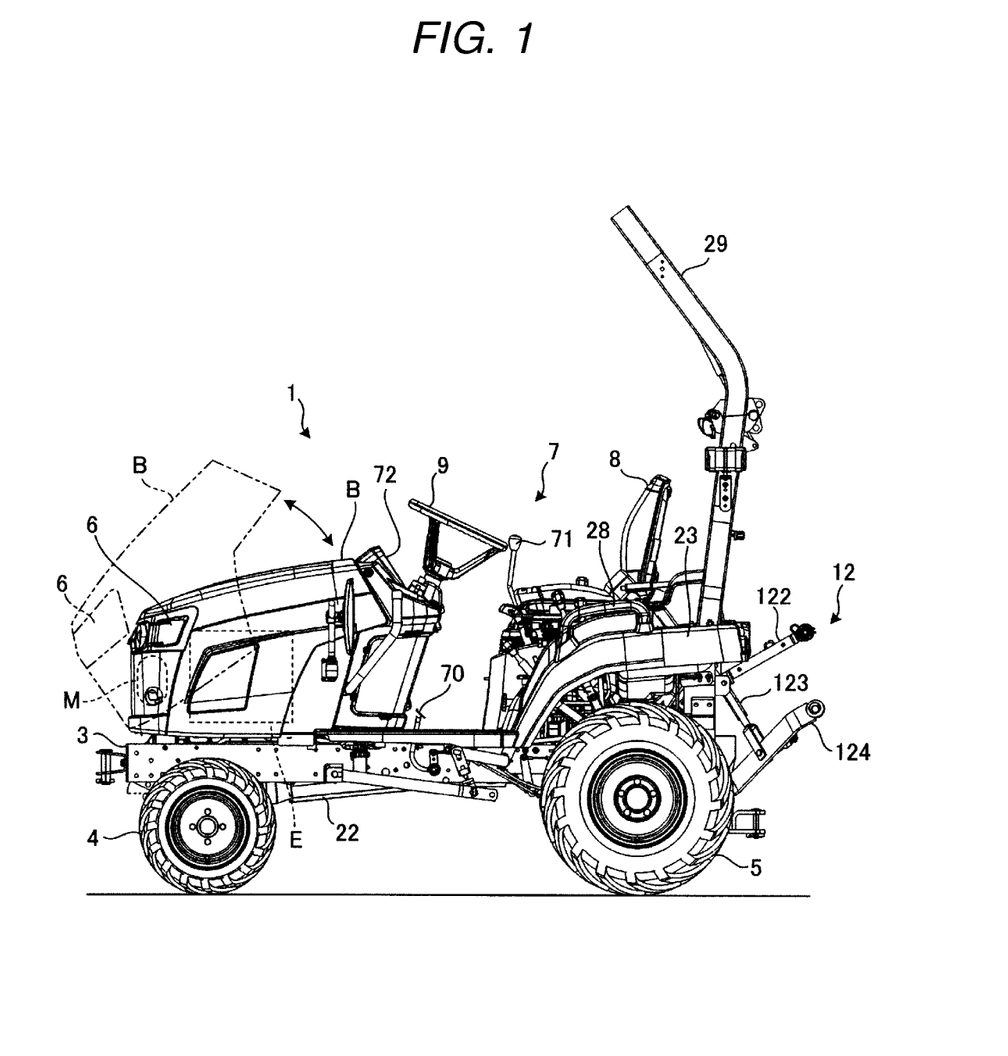
FIG. 1 is a side view of a tractor that is an example of a work vehicle according to an embodiment.

First, an overall configuration of a tractor that is an example of a working vehicle according to the embodiment will be described with reference to FIG. 1. FIG. 1 is a side view of the tractor.

The tractor is an agricultural tractor that is self-propelled and works in a field or the like. Further, the tractor can carry out a predetermined work operation while an operator (also referred to as a worker) is on-board and the tractor is running in the field.

In the following, a front and rear direction of the tractor refers to a straight-line traveling direction of the tractor. Further, in the straight-line traveling direction of the tractor, a direction going from a cockpit 8 to a steering wheel 9 is a forward direction of the tractor, and an opposite direction thereof is a reverse (backward) direction. Further, the front and rear of the tractor are based on the forward direction.

Further, a left and right direction refers to a direction that is laterally orthogonal to the front and rear direction. Here, the left and right are defined with respect to the "front" side in the front and rear direction. That is, with the operator seated in the cockpit 8 and facing forward, his left hand side is "left", and his right hand side is "right." The left and right direction may be parallel to a horizontal plane. Furthermore, an upper and lower direction refers to a direction that is orthogonal to the front and rear direction and the left and right direction. Thus, the front and rear direction, the left and right direction, and the upper and lower direction are three-dimensionally orthogonal to each other. The upper and lower direction may include a vertical direction.

As shown in FIG. 1, the tractor includes a running vehicle body 1 and a lifting device 12 for lifting a work machine connected thereto. The running vehicle body 1 includes a vehicle body frame 3, front wheels 4 serving as steering wheels, rear wheels 5, a bonnet B, an engine E, and a control part 7. The vehicle body frame 3 is a main frame of the running vehicle body 1.

Tractor 1 may include running devices, such as front wheels 4 and rear wheels 5. The front wheels 4 are provided as a pair of left and right wheels. The front wheels 4 are located at a front portion of the running vehicle body 1 and are rotatably connected to an axle. The rear wheels 5 are provided as a pair of left and right wheels and are located at the rear of the running vehicle body 1. In the present embodiment, a four-wheel drive (4 WD) running device is adopted in which a precursor output shaft 22 is connected to the front wheels 4, and both the front wheels 4 and the rear wheels 5 are driving wheels. However, in some embodiments, only the rear wheels 5 may be the driving wheels. The tractor may have a crawler-type crawler belt as the running device, instead of the rear wheels 5.

Upper portions of the rear wheels 5 are covered with fenders 23. The fenders 23 are provided with grips 28 that the worker (operator) can grip when getting on and off the tractor.

The bonnet B is provided in the front portion of the running vehicle body 1 so as to be openable. Although details will be described later, the bonnet B can be pivoted (opened and closed) in the upper and lower direction with a front portion as a pivot center, as shown in FIG. 1. The bonnet B in a closed state covers the engine E mounted on the vehicle body frame 3. The engine E is a drive source of the tractor and is a heat engine such as a diesel engine or a gasoline engine. Power (e.g., rotational power) transmitted from the engine E covered by the bonnet B is appropriately decelerated by a transmission (e.g., transmission mechanism) and transmitted to the front wheels 4 and the rear wheels 5 as running devices and a PTO (Power Take-off).

Further, a muffler M is disposed in front of the engine E inside the bonnet B. Although details will be described later, a headlamp 6 is provided on a front end surface of the bonnet B. The headlamp 6 is located above the muffler M. That is, the muffler M is disposed below the headlamp 6 in the internal space of the bonnet B. In this manner, the headlamp 6 and the muffler M are accommodated in the internal space of the bonnet B, which can contribute to downsizing of the entire tractor.

The control part 7 is provided on the upper portion of the running vehicle body 1. The control part 7 includes the cockpit 8 that is a seat for the operator, and the steering wheel 9 that can be operated by the operator to steer the front wheels 4, and the like. The control part 7 includes a display device 72 for displaying various information in front of the steering wheel 9.

Further, the control part 7 includes various operation pedals such as a brake pedal 70, an accelerator pedal and a clutch pedal, and various operation levers such as a main shift lever 71, a sub shift lever, a forward/backward lever, and an accelerator lever. When the operator depresses the brake pedal 70, a braking device (not shown) can be activated to carry out a braking operation for stopping the rotation of the frontwheels 4 and the rear wheels 5.

Further, the control part 7 of the tractor according to the present embodiment is an open type that does not include a cabin or the like, and a safety bar 29 also called a roll-over protection system (ROPS) frame is tiltably provided at a rear portion of the control part 7. The control part 7 may be provided in a cabin provided on the running vehicle body 1.

A mower 60 (see FIG. 7) can be connected as a work machine to a lower center portion of the running vehicle body 1 of the tractor in the present embodiment. In addition, a work machine such as a rotary tool for performing, for example, a plowing work in a field or the like can be connected to a rear portion of the running vehicle body 1. Therefore, the lifting device 12 for lifting the work machine 60 is provided at a rear portion of the running vehicle body 1.

The lifting device 12 can move the work machine to a non-working position by raising the work machine, and can move the work machine to a ground working position by lowering the work machine. The lifting device 12 includes a lift arm 122, a lift rod 123 and a lower link 124, and also includes a hydraulic lifting cylinder, a top link, and the like.

Figure 2:
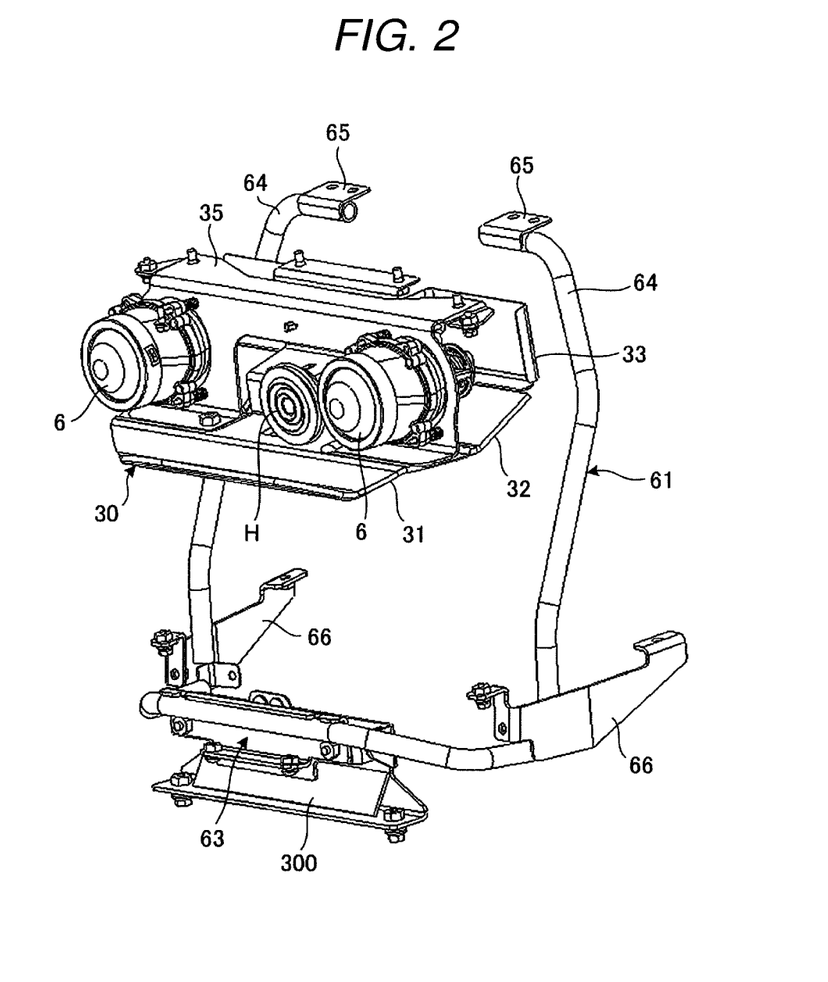
FIG. 2 is an explanatory view showing one aspect of a mounting structure of a headlamp of the tractor.
Figure 3:
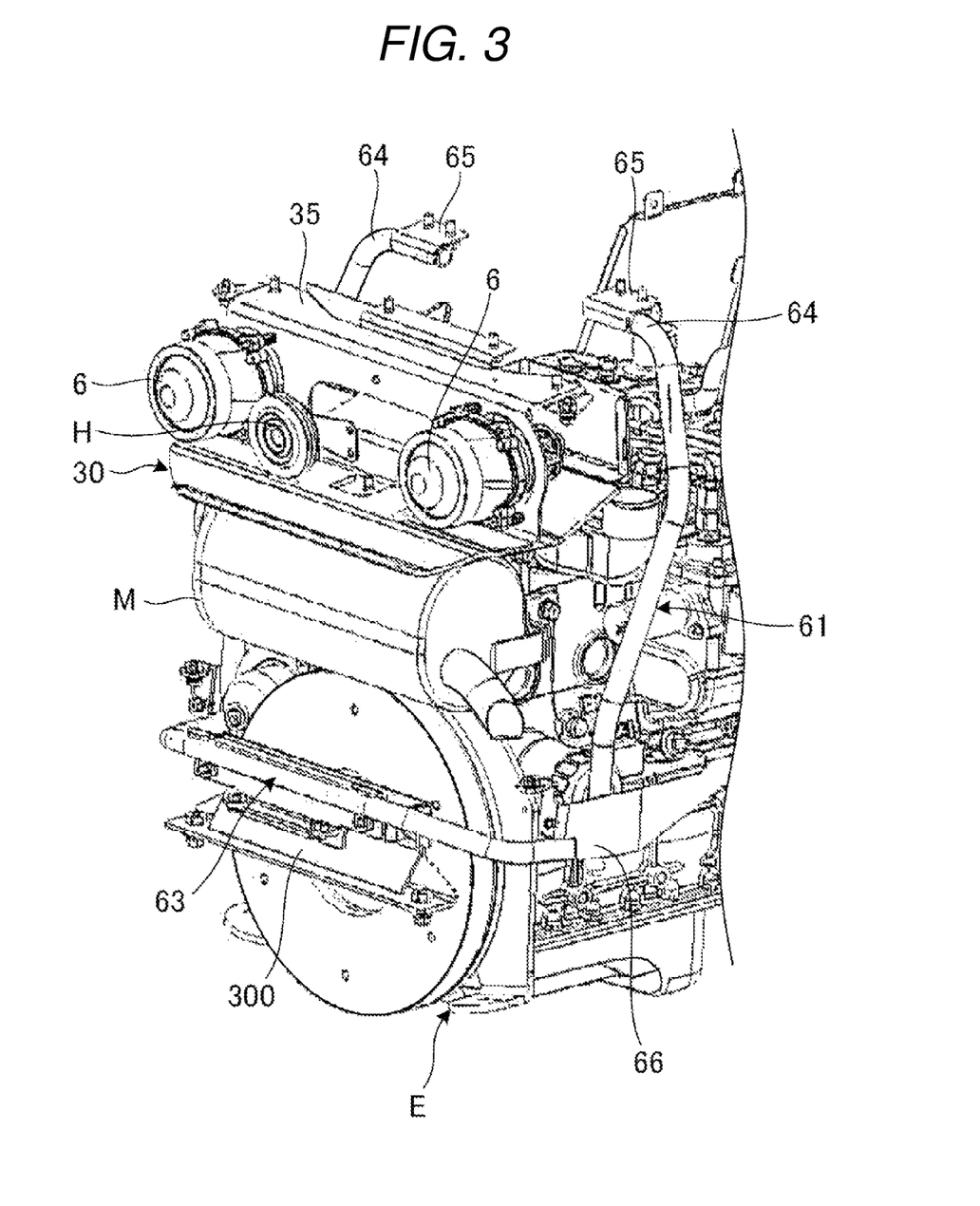
FIG. 3 is an explanatory view showing the inside of a bonnet of the tractor.
Figure 4:
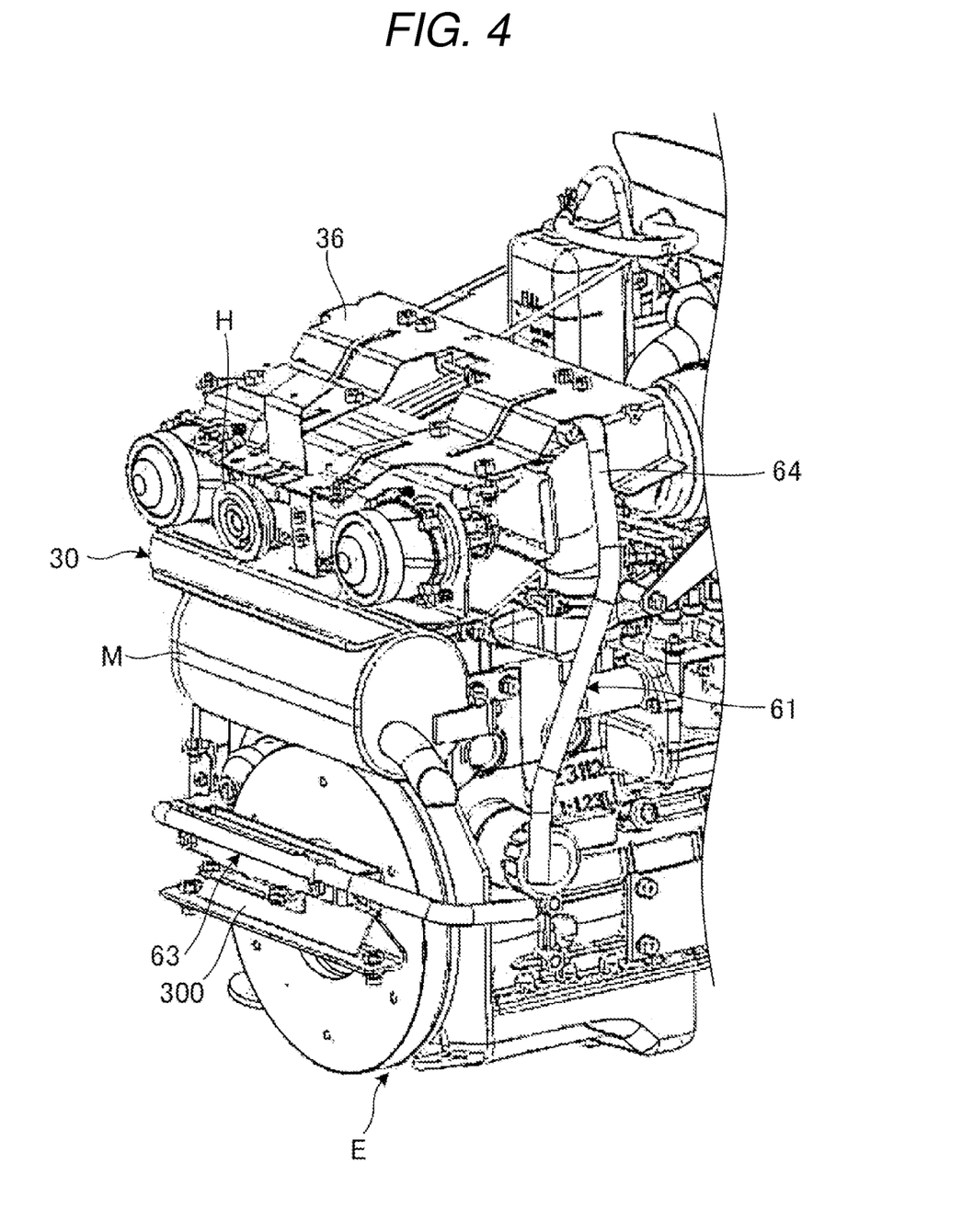
FIG. 4 is an explanatory view showing a mounting plate of the headlamp of the tractor.
Figure 5:
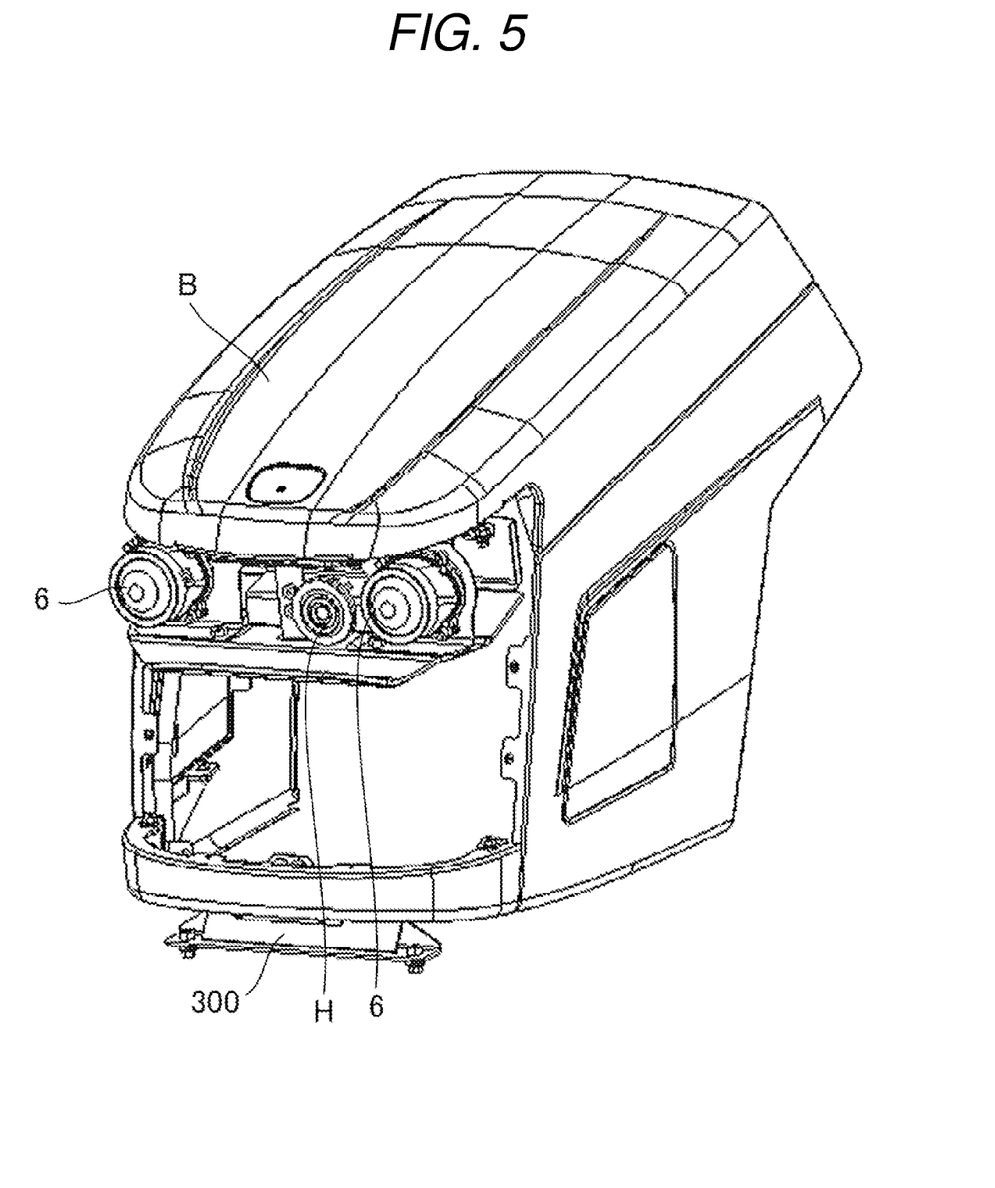
FIG. 5 is an explanatory view showing the bonnet of the tractor.
Figure 6:
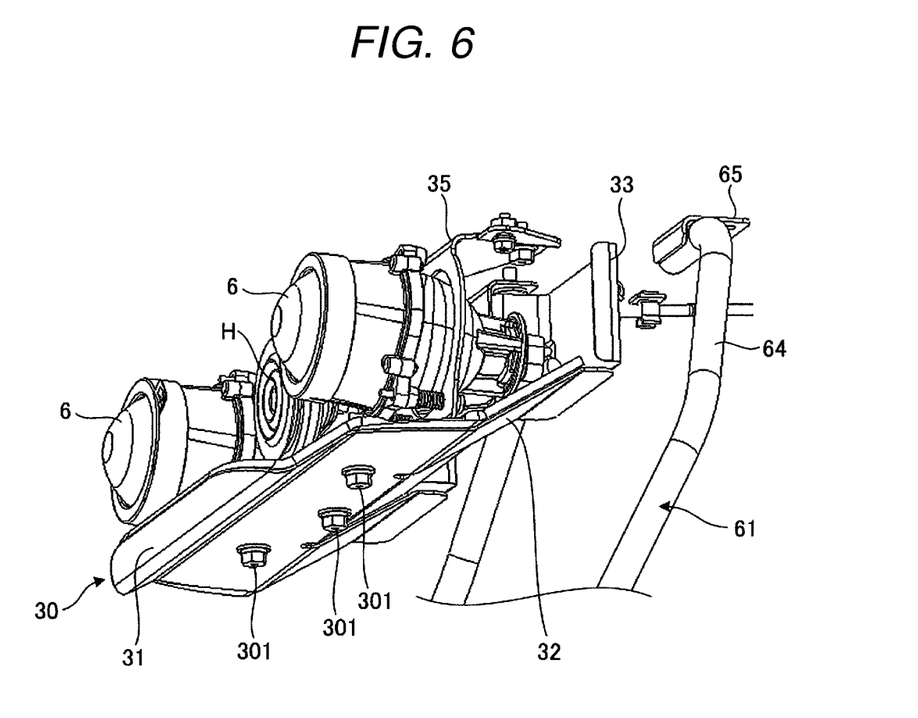
FIG. 6 is an explanatory view showing a heat shield member.

Next, a positional relationship between the headlamp 6 and the muffler M in the internal space of the bonnet B will be specifically described with reference to FIGS. 2 to 6. FIG. 2 is an explanatory view showing one aspect of a mounting structure of the headlamp 6 of the tractor according to the embodiment, FIG. 3 is an explanatory view showing the inside of the bonnet B of the tractor, FIG. 4 is an explanatory view showing a mounting plate of the headlamp 6 of the tractor, FIG. 5 is an explanatory view showing the bonnet B of the tractor, and FIG. 6 is an explanatory view showing a heat shield member.

As shown in FIG. 2, the headlamp 6 of the tractor according to the present embodiment is attached to a headlamp stay 35 for connecting two headlamps 6, 6 arranged on the left and right to the bonnet B. Further, the headlamp stay 35 is connected to a mounting plate 36 for mounting on the bonnet B (FIG. 4).

Specifically, the headlamp stay 35 having the headlamps 6, 6 arranged on the left and right is attached to the bonnet B via the mounting plate 36. In this manner, the headlamp 6 can be securely fixed to the upper side of the bonnet B. As a result, the headlamp 6 is also pivoted in the upper and lower direction, for example, when the bonnet B is pivoted in the upper and lower direction.

Further, the bonnet B is supported by a bonnet frame 61. As shown in FIG. 2, the bonnet frame 61 is formed in a substantially U shape in a front view. The bonnet frame 61 has a left and right extension 63 located below the muffler M, and upward extensions 64 extending upward from both ends of the left and right extension 63 and connected to the bonnet B via the mounting plate 36.

Specifically, mounting seat portions 65 serving as connecting portions with the bonnet B are provided at the tips of the left and right upward extensions 64, respectively. An upper end portion of the bonnet frame 61 and the mounting plate 36 are integrally connected by bolts (not shown). Further, as shown in FIG. 2, both the left and right extension 63 and the upward extensions 64 are welded and integrally connected to connecting members 66. Each connecting member 66 is connected to a lower portion of a side surface of the bonnet B. With this configuration, the headlamp 6 is indirectly attached to the bonnet B via the bonnet frame 61, the mounting plate 36, and the like.

Furthermore, as shown in FIGS. 2 to 5, the left and right extension 63 of the bonnet frame 61 is rotatably supported by a pivot portion 300 provided on the vehicle body side (the running vehicle body frame 3). Therefore, the bonnet B can be pivoted (opened and closed) in the upper and lower direction about the front portion, as shown in FIG. 1.

As shown in FIG. 3, a heat shield member 30 formed in a substantially L-shape in a sectional view is arranged between the headlamp 6 and the muffler M. The material of the heat shield member 30 can be appropriately set in consideration of heat shield efficiency, workability, cost, and the like.

The heat shield member 30 according to the present embodiment is attached to the headlamp stay 35. As shown in FIGS. 2 and 6, the heat shield member 30 has a first heat shield plate portion located below the headlamp 6, and a second heat shield plate portion 33 that is bent from a rear end of the first heat shield plate portion so as to cover a rear portion of the headlamp 6. The first heat shield plate portion has a front heat shield plate portion 31 that extends substantially horizontally (e.g., in the left and right direction), and a rear heat shield plate portion 32 that extends rearward and upward from a rear end of the front heat shield plate portion 31 at a predetermined inclination.

The muffler M connected to the engine E becomes a heat source that emits high-temperature heat. However, when the heat shield member 30 is provided between the headlamp 6 and the muffler M as described above, it is possible to prevent the headlamp 6 from being adversely affected by heat.

Moreover, since the heat shield member 30 has the second heat shield plate portion 33 that is bent so as to cover the rear portion of the headlamp 6, it is possible to reduce or eliminate adverse effects due to heat from the engine E.

Further, a horn H is connected to the front heat shield plate portion 31 of the first heat shield plate portion so as to be located between the left and right headlamps 6, 6. Therefore, similarly to the headlamp 6, the horn H is less likely to be adversely affected by the heat of the muffler M.

Moreover, since the horn H is attached to a central portion of the heat shield member 30 (e.g., the front heat shield plate portion 31), the horn H and the headlamp 6 are integrally pivoted when the bonnet frame 61 is pivoted. Therefore, the harness paths of the horn H and the headlamp 6 to the pivot portion 300 as a pivotal support point can be the same, and the configuration of the layout inside the bonnet B can be made simple.

Furthermore, as shown in FIG. 6, the horn H is attached to mounting portions 301 formed by welding nuts to the heat shield member 30 (the front heat shield plate portion 31) in advance. Thereby, the horn H can be simply and securely attached. Further, since the horn H is attached to the heat shield member 30 at a substantially central position in the left and right direction, the number of obstacles in front of the horn H can be reduced as much as possible, thereby improving the acoustic effect of the horn.

Further, the muffler M is only connected to the engine E, and is not connected to the bonnet frame 61 and the heat shield member 30. In this way, the muffler M has a support structure of a system different from the headlamp 6. Therefore, in addition to heat shielding effect by the heat shield member 30, the transfer of the heat to the headlamp 6 can be more efficiently prevented. For example, heat transfer by conduction may be avoided. The muffler M may be spaced apart and isolated from other components in the bonnet B such as the bonnet frame 61 and the heat shield member 30. Further, in addition to heat, the transfer of vibration can be also prevented.

Figure 7:
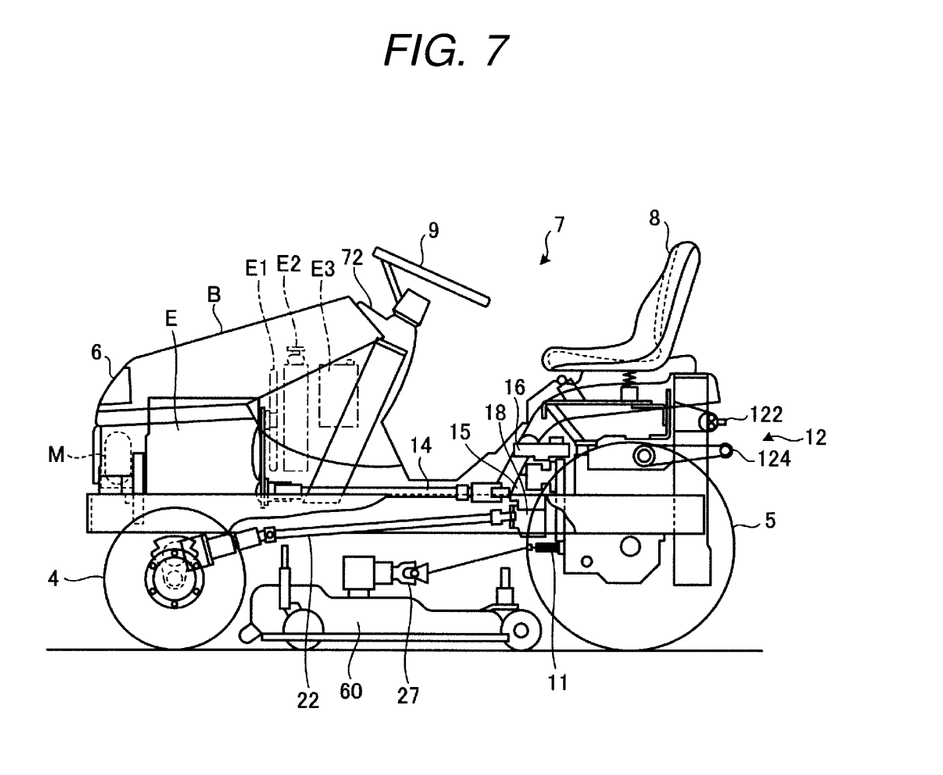
FIG. 7 is a schematic side view of a tractor equipped with a work machine.

FIG. 7 is a schematic side view of a tractor equipped with a work machine (e.g., mower 60). Although the tractor shown in FIG. 7 is a tractor different from the tractor shown in FIG. 1, a positional relationship between the headlamp 6 and the muffler M and the presence of the heat shield member 30 (see FIGS. 2 to 4) are common.

As shown in FIG. 7, the mower 60 arranged substantially in the center of the vehicle body is supplied with power from a PTO shaft 11 via a universal joint 27. From the PTO shaft 11, rotational power that is appropriately decelerated by a transmission is output.

Further, the tractor shown in FIG. 7 includes, as a transmission mechanism, a transmission shaft 14 with a universal joint, which connects the engine E and an HSTP pump 15 of a hydrostatic stepless transmission called an HST (Hydro Static Transmission). The HST includes the HSTP pump 15 and an HST motor 18. In FIG. 7, reference numeral E1 indicates a fan, E2 indicates a radiator, E3 indicates a battery, and reference numeral 16 indicates a hydraulic pressure switching valve.

The following tractors may be realized by the above-described embodiments.

(1) A tractor including the running vehicle body 1 which includes the front wheels 4 and the rear wheels 5 serving as running devices and configured to be replaceably connected to the mower 60 as a work machine; the engine E mounted on the running vehicle body 1 and serving as a drive source for the front wheels 4, the rear wheels 5, and the mower 60; the bonnet B covering the engine E; the headlamp 6 attached to a front portion of the bonnet B; the muffler M arranged below the headlamp 6 in an internal space of the bonnet B; and the heat shield member 30 arranged between the headlamp 6 and the muffler M.

According to such a tractor, the heat shield member 30 provided between the headlamp 6 and the muffler M as a heat source can prevent the headlamp 6 from being adversely affected by heat.

(2) In the tractor of the above (1), the heat shield member 30 has the first heat shield plate portion located below the headlamp 6, and the second heat shield plate portion 33 that is bent from a rear end of the first heat shield plate portion so as to cover a rear portion of the headlamp 6.

According to such a tractor, in addition to the effect of the above (1), it is possible to prevent the headlamp 6 from being adversely affected by the heat from the engine E.

(3) In the tractor of the above (1) or (2), the tractor includes the headlamp stay 35 for connecting the headlamp 6 to the bonnet B, and the mounting plate 36 for mounting the headlamp stay 35 onto the bonnet B.

According to such a tractor, in addition to the effect of the above (1) or (2), the headlamp 6 can be simply and securely fixed to the upper side of the bonnet B.

(4) In the tractor of the above (3), the tractor includes the bonnet frame 61 for supporting the bonnet B, and the bonnet frame 61 has the left and right extension 63 located below the muffler M and rotatably supported, and the upward extensions 64 extending upward from both ends of the left and right extension 63 and connected to the bonnet B via the mounting plate 36, and the bonnet frame 61 is formed in a substantially U shape in a front view.

According to such a tractor, the effect of the above (3) can be further improved.

(5) In the tractor of the above (4), the heat shield member 30 is attached to the headlamp stay 35, and the muffler M is connected to the engine E and is not connected to the bonnet frame 61 and the heatshield member 30.

According to such a tractor, the muffler M has a support structure of a system different from the headlamp 6. Therefore, in addition to heat shielding effect by the heat shield member 30, the transfer of the heat to the headlamp 6 can be more efficiently prevented. Further, in addition to heat, the transfer of vibration can be also prevented. The effect of the above (5) can be further improved.

(6) In the tractor of any one of the above (1) to (5), the horn H is connected to the heatshield member 30.

According to such a tractor, in addition to the effect of any one of the above (1) to (5), the horn H can be simply and securely attached. Further, since the horn H is located at a substantially central position in a left and right direction of the heat shield member 30, the number of obstacles in front of the horn H can be reduced as much as possible, thereby improving the acoustic effect of the horn.

Further effects and modifications can be easily derived by those skilled in the art. Therefore, the broader aspects of the disclosure are not limited to the particular details and representative embodiments shown and described above. In this way, various changes can be made without departing from the gist or scope of the general inventive concepts as may be defined by the appended claims and their equivalents.

1 Running vehicle body
4 Front wheel (running device)
5 Rear wheel (running device)
6 Headlamp
30 Heat shield member
35 Headlamp stay
36 Mounting plate
60 Mower (work machine)
61 Bonnet frame
63 Left and right extension
64 Upward extension
B Bonnet
E Engine
H Horn
M Muffler

What is claimed is:

1. A work vehicle, comprising:
a running vehicle body which comprises running devices and configured to be replaceably connected to a work machine;
an engine mounted on the running vehicle body and serving as a drive source for the running devices and the work machine;
a bonnet covering the engine;
a headlamp attached to a front portion of the bonnet;
a muffler arranged below the headlamp in an internal space of the bonnet;
a heat shield member arranged between the headlamp and the muffler;
a headlamp stay for connecting the headlamp to the bonnet;
a mounting plate for mounting the headlamp stay onto the bonnet; and
a bonnet frame for supporting the bonnet,
wherein the bonnet frame has a left and right extension located below the muffler and rotatably supported, and upward extensions extending upward from both ends of the left and right extension and connected to the bonnet via the mounting plate, and the bonnet frame is formed in a substantially U shape in a front view.

2. The work vehicle according to claim 1,
wherein the heat shield member has a first heat shield plate portion located below the headlamp, and a second heat shield plate portion that is bent from a rear end of the first heat shield plate portion so as to cover a rear portion of the headlamp.

3. The work vehicle according to claim 1,
wherein the heat shield member is attached to the headlamp stay, and
wherein the muffler is connected to the engine and is not connected to the bonnet frame and the heat shield member.

4. The work vehicle according to claim 1,
wherein a horn is connected to the heat shield member.

5. The work vehicle according to claim 1,
wherein the heat shield member is arranged between the headlamp and the muffler in a vertical direction of the work vehicle.

6. The work vehicle according to claim 1,
wherein the headlamp is one of a plurality of headlamps.

7. The work vehicle according to claim 1,
wherein the bonnet is configured to be pivoted with respect to the running vehicle body.

* * * * *